(12) United States Patent
Tanaka et al.

(10) Patent No.: US 7,690,348 B2
(45) Date of Patent: Apr. 6, 2010

(54) DIRECT-INJECTION SPARK-IGNITION INTERNAL COMBUSTION ENGINE

(75) Inventors: Dai Tanaka, Okazaki (JP); Keisuke Nagakura, Toyota (JP); Koji Hata, Okazaki (JP); Joji Matsubara, Seto (JP); Shigeo Yamamoto, Obu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 318 days.

(21) Appl. No.: 11/794,729

(22) PCT Filed: Jan. 6, 2005

(86) PCT No.: PCT/JP2005/000071

§ 371 (c)(1), (2), (4) Date: Jul. 5, 2007

(87) PCT Pub. No.: WO2006/072983

PCT Pub. Date: Jul. 13, 2006

(65) Prior Publication Data
US 2008/0022967 A1    Jan. 31, 2008

(51) Int. Cl.
*F02B 5/00*  (2006.01)
*F02B 17/00* (2006.01)

(52) U.S. Cl. ........... 123/305; 123/295
(58) Field of Classification Search ........... 123/295, 123/298, 305
See application file for complete search history.

(56) References Cited

U.S. PATENT DOCUMENTS

| | | | |
|---|---|---|---|
| 5,927,244 A * | 7/1999 | Yamauchi et al. | 123/295 |
| 5,960,766 A * | 10/1999 | Hellmich | 123/295 |
| 5,996,548 A * | 12/1999 | Hellmich | 123/295 |
| 6,067,954 A | 5/2000 | Kudou et al. | |
| 6,216,662 B1 | 4/2001 | Sapsford et al. | |
| 6,499,457 B2 * | 12/2002 | Suzuki et al. | 123/295 |
| 6,725,827 B2 * | 4/2004 | Ueda et al. | 123/295 |
| 6,840,210 B2 * | 1/2005 | Baika et al. | 123/298 |
| 6,892,693 B2 * | 5/2005 | Montgomery et al. | 123/276 |
| 2003/0127068 A1 * | 7/2003 | Hiraya et al. | 123/276 |

FOREIGN PATENT DOCUMENTS

| | | |
|---|---|---|
| JP | 5-10135 A | 1/1993 |
| JP | 9-144544 A | 6/1997 |
| JP | 11-93676 A | 4/1999 |
| JP | 11-159382 A | 6/1999 |
| JP | 11-182248 A | 7/1999 |
| JP | 11-200867 A | 7/1999 |
| JP | 11-210472 A | 8/1999 |

(Continued)

*Primary Examiner*—Stephen K Cronin
*Assistant Examiner*—Arnold Castro
(74) *Attorney, Agent, or Firm*—Birch, Stewart, Kolasch & Birch, LLP

(57) ABSTRACT

In the top face of a piston (6), there is formed a cavity (30) having a bottom surface (32) which slopes downward toward an exhaust side and which includes a raised part (32a) extending from near the center of the bottom surface to an intake-side wall surface. The cavity guides fuel spray (15) which has been injected by an injector (12) and passed by an electrode part (14a) of a spark plug (14), to arrive near the electrode part of the spark plug again in the form of an air-fuel mixture (15a).

9 Claims, 4 Drawing Sheets

FOREIGN PATENT DOCUMENTS

| | | |
|---|---|---|
| JP | 2000-104551 A | 4/2000 |
| JP | 2000-345847 A | 12/2000 |
| JP | 2003-524729 A | 8/2003 |
| JP | 2003-269176 A | 9/2003 |
| JP | 2004-44430 A | 2/2004 |
| JP | 2004-138028 A | 5/2004 |
| JP | 2004-190530 A | 7/2004 |

* cited by examiner

DIRECT-INJECTION SPARK-IGNITION INTERNAL COMBUSTION ENGINE

BACKGROUND OF THE INVENTION

1. Field of the Invention

This invention relates to a direct-injection spark-ignition internal combustion engine, and specifically, a technique for forming an air-fuel mixture.

2. Description of the Related Art

In respect of a direct-injection spark-ignition internal combustion engine in which fuel is injected directly into a combustion chamber, there is known a technique called spray guide method, in which an injector is fitted to an upper wall of the combustion chamber, in a central area thereof, and a spark plug is arranged with its electrode part located within or near a fuel injection area, so that stratified charge combustion can be carried out by directly igniting fuel spray formed from fuel injected by the injector and vaporized in part.

In such stratified charge lean combustion by the spray guide method, ignition is carried out during fuel injection period, so that combustion begins during the compression stroke in which fuel is injected. When combustion begins during or directly after fuel injection like this, an excessively rich air-fuel mixture is formed locally within the fuel spray, and such excessively rich air-fuel mixture burns at high temperatures and produces an increased amount of NOx.

Further, in the spray guide method, fuel spray gradually moves away from the spark plug, and flames generated by ignition by the spark plug spread within the combustion chamber in a manner following the movement of the fuel spray. Thus, combustion progresses relatively slowly. When combustion progresses slowly like this, the allowable limit of exhaust gas introduction quantity in EGR lowers, which makes the reduction of NOx difficult.

Slowly progressing combustion also causes a problem such that when the vaporization of fuel progresses so that the air-fuel mixture diffuses excessively, flames cannot keep up with the movement of the air-fuel mixture and vanishes so that unburned HC is emitted.

Particularly in the stratified charge combustion in low-load operation, fuel injection quantity is small and therefore injection period is short, so that the period of time in which ignition can be carried out by the spray guide method is short. Thus, there is a problem that in low-load operation, stable combustion region is narrow and stability of combustion is not sufficient.

Thus, in order to carry out stratified charge combustion stably in the direct-injection spark-ignition internal combustion engine, a technique has been developed, in which intake air flowing in through an intake port is caused to rise as tumbling flow by a cavity formed in the top face of a piston, and fuel is injected toward the side to which the tumbling flow rises (Japanese Unexamined Patent Publication No. Hei 11-210472).

In the technique disclosed in the above publication, however, the tumbling flow formed from the intake air is relatively weak. Thus, actually, it is difficult to guide the fuel spray by means of such tumbling flow, thereby stabilizing the stratified charge combustion.

SUMMARY OF THE INVENTION

This invention has been made to solve problems as mentioned above, and the primary object thereof is to provide a direct-injection spark-ignition internal combustion engine which can sufficiently improve the stability of stratified charge combustion and reduce NOx and HC emissions.

In order to achieve the above object, a direct-injection spark-ignition internal combustion engine according to this invention comprises a combustion chamber defined by an undersurface of a cylinder head, a cylinder and a top face of a piston; a cavity of a concave shape formed in the top face of the piston, the cavity having a bottom surface that slopes downward, from a first end to an opposite second end, and a wall surface that slopes upward from the periphery of the bottom surface; an injector fitted to the undersurface of the cylinder head, on said first-end side, for injecting fuel directly into the combustion chamber; and a spark plug fitted to the undersurface of the cylinder head, on said second-end side, with an electrode part located within or near a fuel injection area in which fuel is injected by the injector.

In this configuration, fuel injected by the injector passes by the electrode part of the spark plug and enters the cavity. Then, the fuel is guided by the sloping bottom surface of the cavity to the spark-plug side wall surface, and then caused to curl upward along the wall surface and collect around the electrode part again.

Thus, the fuel injected by the injector exists near the spark plug, not only during fuel injection, but also after fuel injection in more vaporized form, namely in the form of an air-fuel mixture. This greatly enlarges the ignition period that allows stratified charge combustion to be successfully caused. Consequently, even in low-load operation in which fuel injection quantity is small and fuel injection period is short, combustion can be carried out with improved stability.

Further, when ignition is carried out during fuel injection, flames spread following the movement of fuel spray, while the front end of the moving fuel spray, which is vaporized to form an air-fuel mixture, is caused by the cavity to curl upward and move toward the spreading flames. Thus, the combustion progresses rapidly, which raises the allowable limit of exhaust gas introduction quantity in EGR. Consequently, NOx emissions can be reduced by introducing a large amount of exhaust gases in EGR.

Meanwhile, in the case where the air-fuel mixture that has been caused by the cavity to curl upward and collect around the electrode part after fuel injection is ignited, combustion takes place near the top dead center. Thus, thermal efficiency improves, so that torque can be produced effectively.

Here, desirably, the injector should be arranged to inject fuel toward the electrode part of the spark plug and into the cavity, and in a manner such that the fuel injected by the injector spreads more to the spark plug side.

Further, desirably, the injector should be arranged such that the fuel injected by the injector is guided by the cavity to be supplied to the spark plug.

In this case, the fuel injected by the injector is easily caused to pass by the electrode part of the spark plug, and easily guided by the cavity to around the electrode part of the spark plug. In other words, the air-fuel mixture is guided to around the electrode part of the spark plug in a good manner.

In addition to the air-fuel mixture moving towards the flames after fuel injection, the injector injects fuel to spread more to the spark plug side. This can prevent excessive diffusion of the air-fuel mixture and thereby reduce unburned HC emissions, particularly in low-load operation.

Desirably, the injector should be located in a central area of the undersurface of the cylinder head that defines the combustion chamber, and the spark plug should be located in said central area of the undersurface of the cylinder head, beside the injector.

Desirably, the bottom surface should have a raised part higher than a part around, the raised part extending from near the center of the bottom surface to said first end.

In the case where the bottom surface of the cavity has a raised part extending from near the center of the bottom surface to the injector side and a sloping wall surface rises from the periphery of the bottom surface, fuel spray is caused by the raised part to move to the periphery of the bottom surface, and then curls upward along the sloping wall surface, in the form of an air-fuel mixture. This can prevent the air-fuel mixture from becoming excessively rich in its central part and hence near the electrode part of the spark plug, and thereby prevent smouldering electrode part.

Desirably, the raised part should be provided such that the part of the bottom surface other than the raised part is a hollow which is approximately a U-shape when viewed from above.

In this case, the air-fuel mixture caused by the cavity to curl upward can form an optimal shape of distribution to prevent smouldering around the electrode part and sufficiently improve the stability of stratified charge combustion.

Desirably, the cavity should decrease in opening width, toward the spark-plug side.

In this case, fuel can be more easily guided to around the electrode part of the spark plug, or in other words, the air-fuel mixture can be guided to around the electrode part of the spark plug in a better manner.

DETAILED DESCRIPTION OF THE INVENTION

On the basis of the attached drawings, an embodiment of this invention will be described below.

Figure 1:
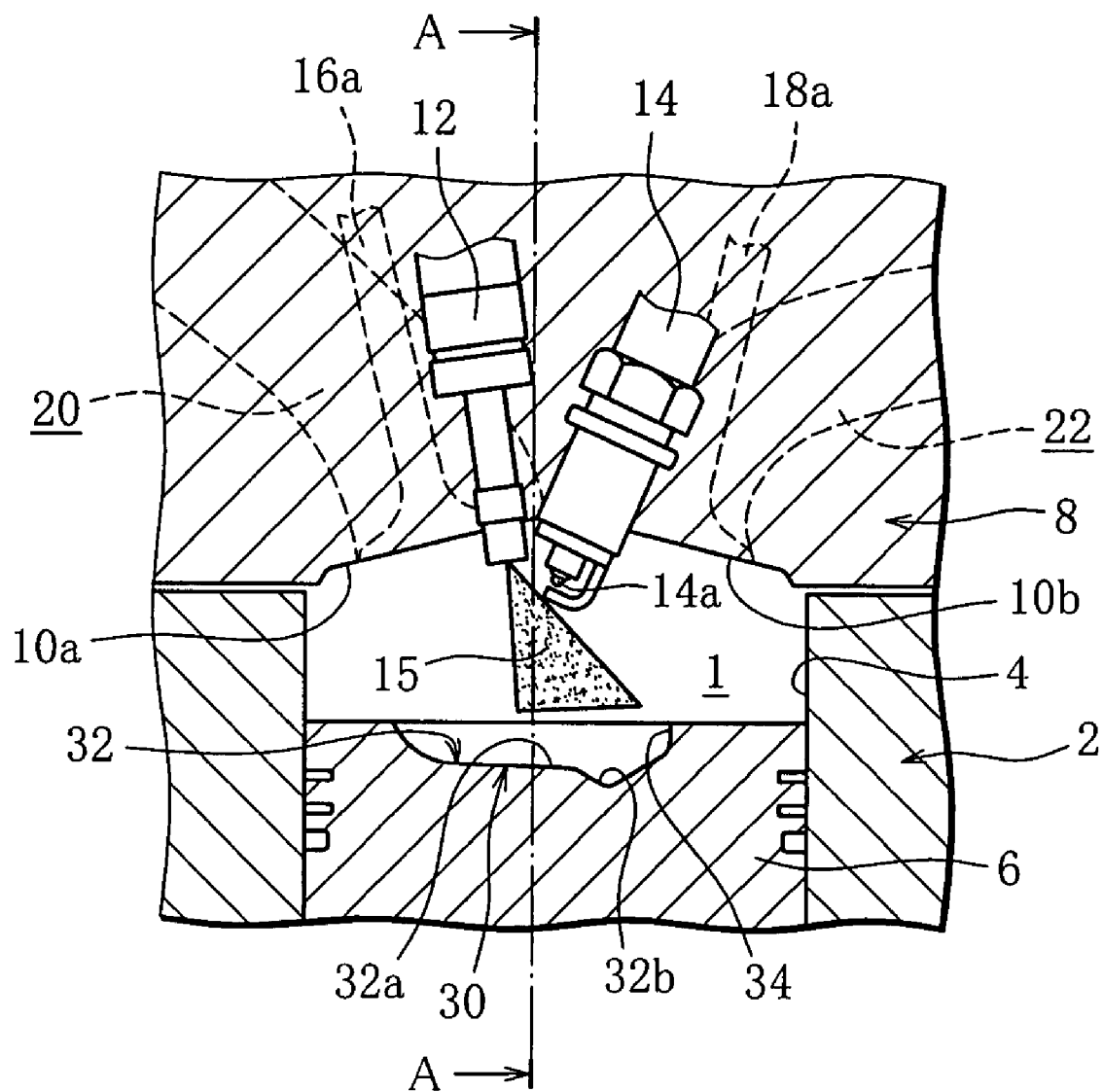
FIG. 1 is a vertical cross-sectional view of a combustion chamber of a direct-injection spark-ignition internal combustion engine according to this invention.
Figure 2:
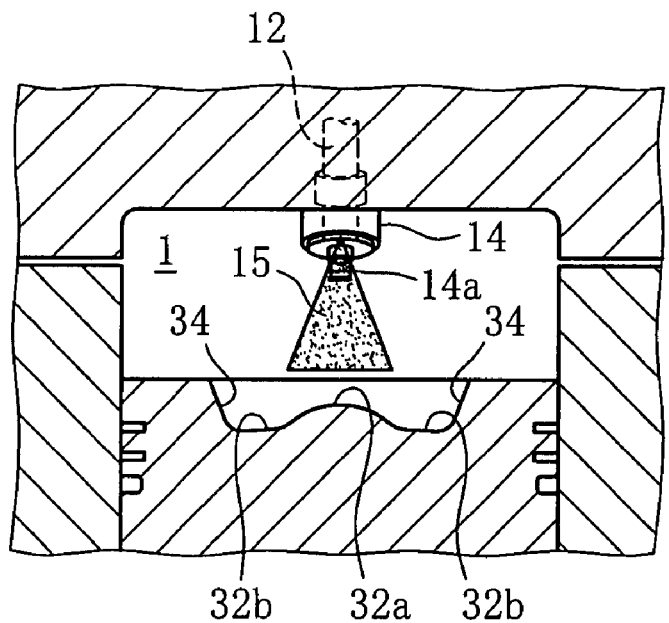
FIG. 2 is a cross-sectional view along line A-A of FIG. 1.
Figure 3:
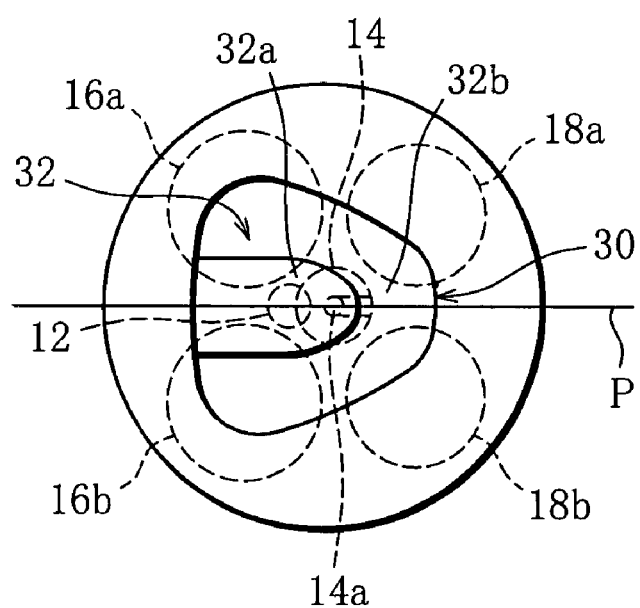
FIG. 3 is a top view of a piston shown in FIG. 1.

FIG. 1 is a vertical cross-sectional view of a combustion chamber of a direct-injection spark-ignition internal combustion engine according to this invention, FIG. 2 a cross-sectional view along line A-A of FIG. 1, and FIG. 3 a top view of a piston shown in FIG. 1. The following description will be given on the basis of FIGS. 1 to 3.

As shown in FIG. 1, a combustion chamber 1 is defined by a cylinder-shaped cylinder 4 formed in a cylinder block 2, a top face of a piston 6 fitted to be able to slide up and down within the cylinder 4, and an undersurface of a cylinder head 8 mounted on the cylinder block 2.

The undersurface of the cylinder head 8 which forms an upper wall of the combustion chamber 1 has a so-called pent roof shape consisting of two sloping surfaces 10a, 10b meeting at an obtuse angle.

In a central area of the upper wall of the combustion chamber 1, an injector 12 is fitted to the sloping surface 10a, while a spark plug 14 is fitted to the other sloping surface 10b.

The injector 12 is arranged to inject fuel, not directly downward but somewhat toward an electrode part 14a of the spark plug 14. Further, the injector 12 is arranged such that fuel injected by the injector 12 spreads more to the spark plug 14 side.

Likewise, the spark plug 14 is arranged to generate electric discharges, not directly downward but somewhat toward the injector 12. Further, the spark plug 14 is arranged such that the electrode part 14a is located within or near the fuel injection area in which fuel is injected by the injector 12, or in other words, in or near fuel spray 15 produced.

On the sloping surface 10a side, two intake valves 16a, 16b are provided to be located on both sides of the injector 12. On the sloping surface 10b side, two exhaust valves 18a, 18b are provided to be located on both sides of the spark plug 14.

The intake valves 16a, 16b and exhaust valves 18a, 18b are designed to slide up and down within intake ports 20 and exhaust ports 22 formed in the cylinder head 8, thereby connecting and disconnecting each intake port 20 or exhaust port 22 and the combustion chamber 1.

In the following description, the plane within the combustion chamber 1 that passes though the end of the injector 12 and the end of the spark plug 14 will be referred to as plane P, the sloping surface 10a side of the combustion chamber 1 on which the injector 12 and the intake valves 16a, 16b are provided will be referred to as intake side, and the sloping surface 10b side of the combustion chamber 1 on which the spark plug 14 and the exhaust valves 18a, 18b are provided will be referred to as exhaust side.

A cavity 30 is formed on the top face of the piston 6 which forms the bottom surface of the combustion chamber 1.

The cavity 30 has a concave shape consisting of a bottom surface 32 and a wall surface 34.

Specifically, the bottom surface 32 of the cavity 30 generally slopes downward, toward the exhaust side. The bottom surface 32 has a raised part 32a higher than a part around, which extends from near the center of the bottom surface 32 up to the intake-side wall surface 34, along the plane P. Thus, the raised part 32a is surrounded by a hollow 32b, which is approximately a U-shape when viewed from above.

As shown in FIG. 3, the cavity 30 has opposing edges gradually approaching the plane P, toward the exhaust side, so that the cavity 30 gradually decreases in opening width, toward the exhaust side.

The wall surface 34 of the cavity 30 slopes upward smoothly from the periphery of the bottom surface 32.

Next, how the direct-injection spark-ignition internal combustion engine according to this invention having the above-described structure operates will be described.

Figure 4:
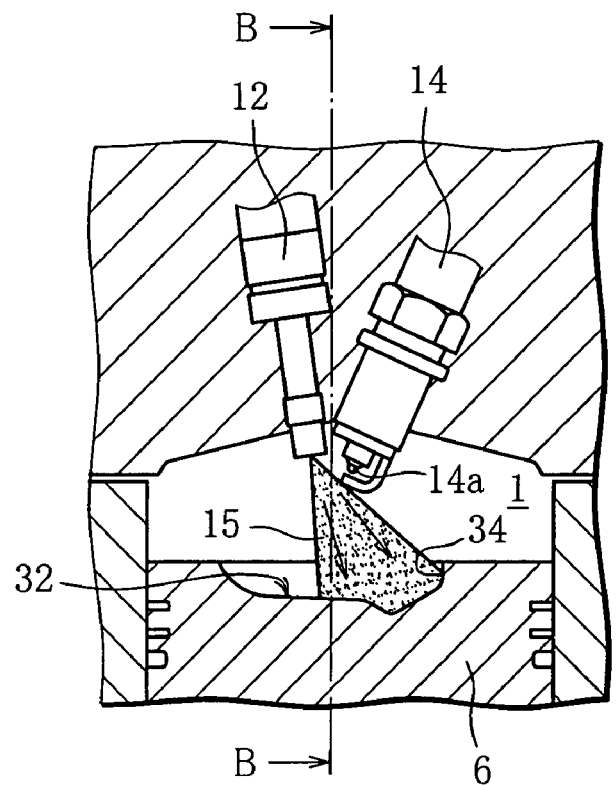
FIG. 4 is a cross-sectional view of a combustion chamber, showing distribution of fuel spray during fuel injection in the direct-injection spark-ignition internal combustion engine according to this invention.
Figure 5:
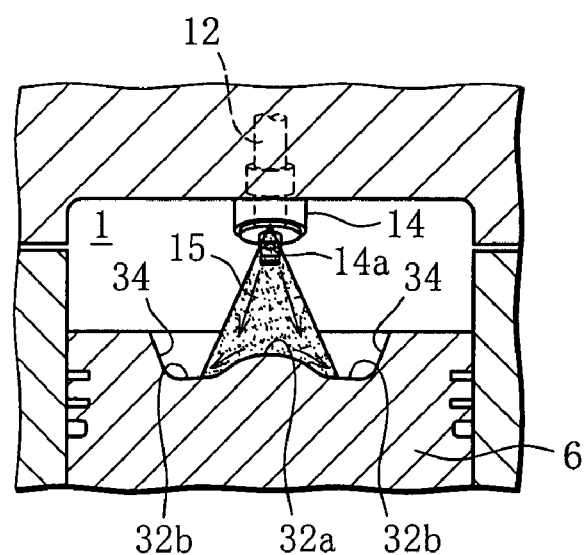
FIG. 5 is a cross-sectional view along line B-B of FIG. 4.
Figure 6:
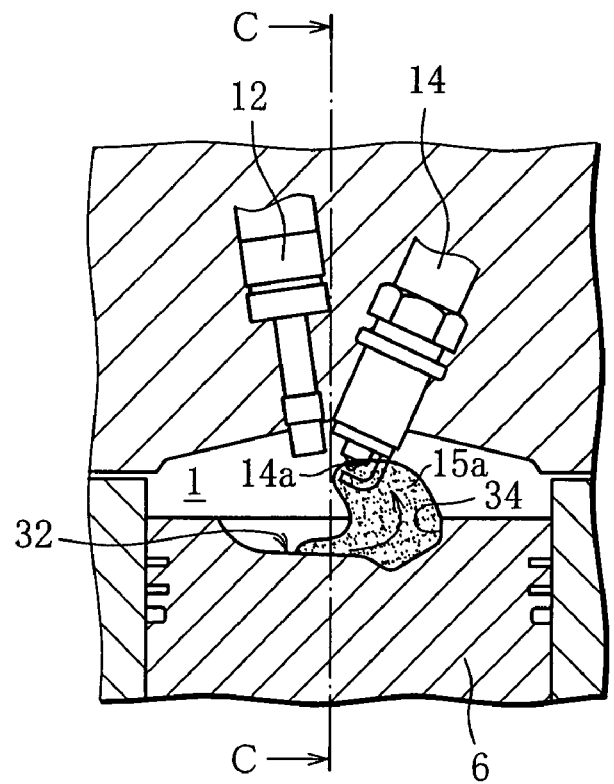
FIG. 6 is a cross-sectional view of the combustion chamber, showing distribution of an air-fuel mixture formed by fuel vaporizing after fuel injection in the direct-injection spark-ignition internal combustion engine according to this invention.
Figure 7:
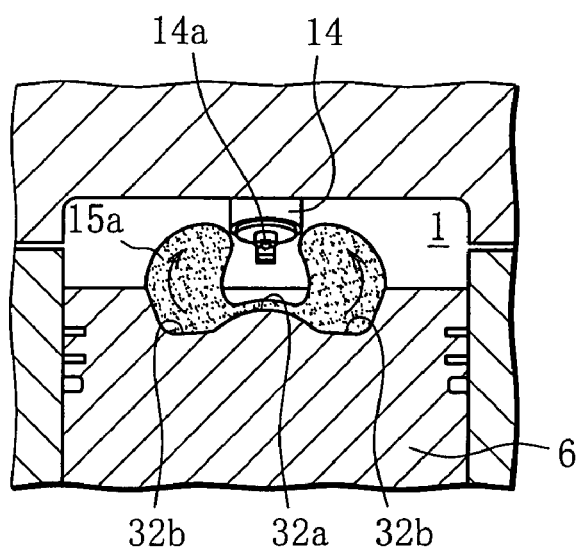
FIG. 7 is a cross-sectional view along line C-C of FIG. 6.

FIG. 4 is a cross-sectional view of the combustion chamber, showing distribution of fuel spray during fuel injection in the direct-injection spark-ignition internal combustion engine according to this invention; FIG. 5 is a cross-sectional view along line B-B of FIG. 4; FIG. 6 is a cross-sectional view similar to FIG. 4, showing distribution of an air-fuel mixture formed by fuel vaporizing after fuel injection in the direct-injection spark-ignition internal combustion engine according to this invention; and FIG. 7 is a cross-sectional view along line C-C of FIG. 6. The following description will be given on the basis of FIGS. 4 to 7.

As shown in FIGS. 4 and 5, when the piston 6 is in late compression stroke, fuel is injected from the end of the injector 12 to spread more to the spark plug 14 side. Fuel injected forms fuel spray 15, which passes by the electrode part 14a of the spark plug 14 and enters the cavity 30 in the top face of the piston 6, mainly the exhaust side thereof. Here, it is desirable to arrange such that the fuel spray 15 formed by fuel injection by the injector 12 has a hollow-shaped distribution, for example, a hollow cone-like distribution, although not limited to this.

Since the bottom surface 32 of the cavity 30 slopes downward toward the exhaust side and the fuel spray 15 spreads more to the spark plug 14 side, the fuel spray 15 that has entered the cavity 30 and collided against the bottom surface 32 of the cavity 30 is guided to the exhaust side in a good manner, while being further vaporized. Here, the fuel spray 15 that has collided against the raised part 32a of the bottom surface 32 is spread to both sides of the raised part 32a and to the exhaust side.

Then, as shown in FIGS. 6 and 7, the fuel spray 15 moves toward the exhaust-side wall surface 34, guided by the shape of the bottom surface 32, then moves upward along the wall surface 34, while being further vaporized, and leaves the cavity 30 as an air-fuel mixture 15a.

The air-fuel mixture 15a that has left the cavity 30 in the above-described manner curls upward to surround the electrode part 14a of the spark plug 14. Consequently, there exists a relatively rich air-fuel mixture around the electrode part 14a.

Specifically, since the fuel spray 15 has a hollow-shaped distribution, the spray 15 is spread to both sides by the raised part 32a of the bottom surface 32 of the cavity 30, moves toward the periphery of the bottom surface 32 and curls upward into the combustion chamber 1. The amount of fuel contained in the air-fuel mixture 15a formed is small in the central part of the mixture. Thus, the air-fuel mixture 15a does not become excessively rich around the electrode part 14a.

When fuel is injected by the injector 12 in the above-described manner, two methods of ignition different in ignition timing are conceivable: so-called spray guide method in which fuel spray 15 formed during fuel injection as shown in FIGS. 4 and 5 is directly ignited, and so-called wall guide method in which an air-fuel mixture 15a that has left the cavity 30 and collected around the electrode part 14a as shown in FIGS. 6 and 7 is ignited.

For example, in the spray guide method, ignition is carried out in the last half of fuel ignition. In this case, flames spread from the back end of the fuel spray 15 in a manner following the movement of the fuel spray 15, while the front end of the fuel spray 15 guided by the cavity 30 turns into an air-fuel mixture 15a, which collects around the electrode part 14a again. The collecting air-fuel mixture 15a collides against the spreading flames, so that combustion progresses rapidly.

When the combustion progresses rapidly like this, the allowable limit of exhaust gas introduction quantity in EGR rises, so that NOx emissions can be reduced by introducing a large amount of exhaust gases in ECR.

In addition to the air-fuel mixture 15a colliding against the spreading flames, the fuel spray 15 is injected to spread more to spark plug 14 side. This can prevent excessive diffusion of the air-fuel mixture and thereby reduce unburned HC emissions, particularly in low-load operation.

Meanwhile, in the wall guide method, ignition is carried out to ignite the air-fuel mixture 15a that has collected around the electrode part 14a after fuel injection. This can cause combustion to takes place near the top dead center, thereby producing torque effectively.

In addition, in this case, the above-described function of the raise part 32a of the bottom surface 32 of the cavity 30 prevents the air-fuel mixture 15a from becoming excessively rich around the electrode part 15a. Thus, smouldering around the electrode part 14a can be prevented.

Further, even if ignition fails in the spray guide method or flames vanish while spreading after ignition in the spray guide method, combustion can be completed by carrying out ignition in the wall guide method, after that.

Specifically, the direct-injection spark-ignition internal combustion engine according to the present invention allows ignition to be carried out not only during fuel injection but also after fuel injection. Thus, for example, it is possible to carry out ignition twice, in the spray guide method and in the wall guide method, or carry out ignition in the wall guide method after misfire in the spray guide method is detected. Consequently, in addition to the above-mentioned reduction in NOx and unburned HC emissions, enlargement of the stable combustion region can be achieved. Thus, for example, even when the internal combustion engine is operating with low load so that the fuel injection quantity is small and the fuel injection period is short, the stratified charge combustion can be carried out with improved stability.

An embodiment of the direct-injection spark-ignition internal combustion engine according to the present invention has been described. The present invention is, however, not limited to the described embodiment.

For example, although in the described embodiment, the hollow 32b of the cavity 30 is approximately a U-shape when viewed from above, the hollow may be of any shape that can direct the fuel spray 15 to the spark plug 14 side and distribute the air-fuel mixture 15a so that the air-fuel mixture 15a will not become excessively rich in the central part of distribution.

Further, although in the described embodiment, the upper wall of the combustion chamber 1 is a pent roof shape, it is not limited to this but can be another shape.

Further, although in the described embodiment, the top face of the piston 6 is a flat shape as an example, it is not limited to this. For example, the piston 6 may have a conically-shaped tapered end, corresponding to the pent roof shape of the upper wall of the combustion chamber 1.

Further, although in the described embodiment, the intakes valves 16a, 16b are disposed on both sides of the injector 12 and the exhaust valves 18a, 18b are disposed on both sides of the spark plug 14, the configuration is not limited to this. For example, the configuration may be such that the intakes valves 16a, 16b are disposed on one side of the plane P and the exhaust valves 18a, 18b are on the other side.

The invention claimed is:

1. A direct-injection spark-ignition internal combustion engine, comprising:

a combustion chamber defined by an undersurface of a cylinder head, a cylinder and a top face of a piston, a cavity of a concave shape formed in the top face of the piston, the cavity having a bottom surface that slopes downward, from a first end to a second end opposite to the first end, and a wall surface that slopes upward from the periphery of the bottom surface, an injector fitted to the undersurface of the cylinder head, on said first-end side, for injecting fuel directly into the combustion chamber, and a spark plug fitted to the undersurface of the cylinder head, on said second-end side, with an electrode part located within or near a fuel injection area in which fuel is injected by the injector, the spark plug being capable of igniting fuel spray during fuel injection and then igniting fuel spray that is guided along the bottom surface of the cavity and curls up along the wall surface, wherein said bottom surface has a raised part higher than a part around, the raised part extending from near the center of the bottom surface to said first end.

2. The direct-injection spark-ignition internal combustion engine according to claim 1, wherein the injector is arranged to inject fuel toward the electrode part of the spark plug and into the cavity, in a manner such that the fuel injected by the injector spreads more to the spark plug side.

3. The direct-injection spark-ignition internal combustion engine according to claim 2, wherein the injector is arranged such that the fuel injected by the injector is guided by the cavity to be supplied to the spark plug.

4. The direct-injection spark-ignition internal combustion engine according to claim 1, wherein the injector is located in a central area of the undersurface of the cylinder head that defines the combustion chamber, and the spark plug is located in said central area of the undersurface of the cylinder head, beside the injector.

5. The direct-injection spark-ignition internal combustion engine according to claim 1, wherein the raised part is provided such that the part of the bottom surface other than the raised part is a hollow which is approximately a U-shape when viewed from above.

6. The direct-injection spark-ignition internal combustion engine according to claim 1, wherein the cavity decreases in opening width, from the injector side to the spark plug side.

7. The direct-injection spark-ignition internal combustion engine according to claim 2, wherein the injector is located in a central area of the undersurface of the cylinder head that defines the combustion chamber, and the spark plug is located in said central area of the undersurface of the cylinder head, beside the injector.

8. The direct-injection spark-ignition internal combustion engine according to claim 3, wherein the injector is located in a central area of the undersurface of the cylinder head that defines the combustion chamber, and the spark plug is located in said central area of the undersurface of the cylinder head, beside the injector.

9. The direct-injection spark-ignition internal combustion engine according to claim 6, wherein the cavity decreases in opening width, from the injector side to the spark plug side.

* * * * *